(12) United States Patent
Matsuoka (10) Patent No.: US 8,344,735 B2
(45) Date of Patent: Jan. 1, 2013

(54) SOLID ELECTROLYTIC CAPACITOR (75) Inventor: Keiko Matsuoka, Izumisano (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 341 days.

(21) Appl. No.: 12/847,188

(22) Filed: Jul. 30, 2010

(65) Prior Publication Data

US 2011/0051318 A1 Mar. 3, 2011

(30) Foreign Application Priority Data

Aug. 25, 2009 (JP) ................................. 2009-194283

(51) Int. Cl.
*G01R 31/12* (2006.01)
*H01G 9/00* (2006.01)
(52) U.S. Cl. ........................ 324/548; 361/528; 361/540
(58) Field of Classification Search ........................ None
See application file for complete search history.

(56) References Cited

U.S. PATENT DOCUMENTS 6,808,541 B2 * 10/2004 Maeda .......................... 29/25.03
7,835,138 B2 * 11/2010 Yamashita et al. ............ 361/523

FOREIGN PATENT DOCUMENTS

JP        2002-134359 A        5/2002

* cited by examiner

*Primary Examiner* — Minh N Tang
(74) *Attorney, Agent, or Firm* — Westerman, Hattori, Daniels & Adrian, LLP (57) ABSTRACT

The solid electrolytic capacitor includes a solid electrolyte type capacitor element including a dielectric layer intervening between an anode section and a cathode section, and an insulating substrate. The insulating substrate includes a first surface on which the capacitor element is mounted and a second surface opposite to the first surface. The first surface is provided thereon with a first anode layer to which the anode section is electrically connected and a first cathode layer to which the cathode section is electrically connected. The second surface is provided thereon with a second anode layer electrically connected to the first anode layer and a second cathode layer electrically connected to the first cathode layer. Here, a pad member with electrical insulation property projects on the first surface of the insulating substrate, and the first anode layer is formed on a tip end surface of the pad member.

6 Claims, 8 Drawing Sheets

SOLID ELECTROLYTIC CAPACITOR

The Japanese patent application Number 2009-194283, upon which this patent application is based, is hereby incorporated by reference.

BACKGROUND OF THE INVENTION

1. Field of the Invention

The present invention relates to a solid electrolytic capacitor in which a solid electrolyte type capacitor element is mounted on an insulating substrate.

2. Description of Related Art

Figure 16:
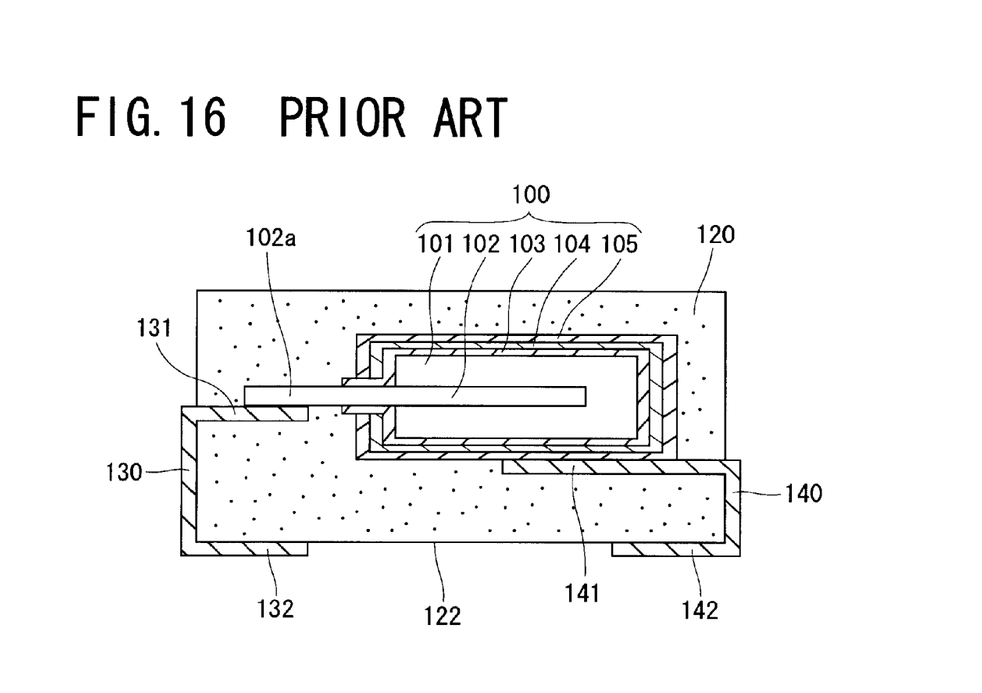
FIG. 16 is a cross sectional view showing a conventional solid electrolytic capacitor.

FIG. 16 is a cross sectional view of a conventional solid electrolytic capacitor. As shown in FIG. 16, the conventional solid electrolytic capacitor has a solid electrolyte type capacitor element 100, an anode terminal 130, and a cathode terminal 140, which are buried in an enclosure resin 120. The capacitor element 100 has a dielectric layer 103 formed on a surface of an anode body 101 in which an anode lead 102 is planted, an electrolyte layer 104 formed on the dielectric layer 103, and a cathode layer 105 formed on the electrolyte layer 104.

The anode terminal 130 includes one end part 131 which is connected to a tip end part 102a of the anode lead 102 electrically, and the cathode terminal 140 includes one end part 141 which is connected to the cathode layer 105 of the capacitor element 100 electrically. Both the anode terminal 130 and the cathode terminal 140 are drawn out from the enclosure resin 120, and are bent along an outer peripheral surface of the enclosure resin 120 to be extended to a lower surface 122 of the enclosure resin 120. Thereby the other end parts 132, 142 of respective terminals 130, 140 are arranged on the lower surface 122 of the enclosure resin 120, and the other end parts 132, 142 form lower surface electrodes of the solid electrolytic capacitor.

In a manufacturing process of the conventional solid electrolytic capacitor, a bending process needs to be performed on the anode terminal 130 and the cathode terminal 140. Because of this, it is necessary that a portion of the enclosure resin 120 intervening between a lower surface of the capacitor element 100 and the lower surface electrodes has a great thickness, and therefore, a space factor of the capacitor element 100 decreases in the conventional solid electrolytic capacitor. Also, because developed lengths of the anode terminal 130 and the cathode terminal 140 are great, lengths of electrically-conducting paths from the capacitor element 100 to the lower surface electrodes are also great, increasing the equivalent series resistance (ESR) or equivalent series inductance (ESL) of the solid electrolytic capacitor.

Figure 17:
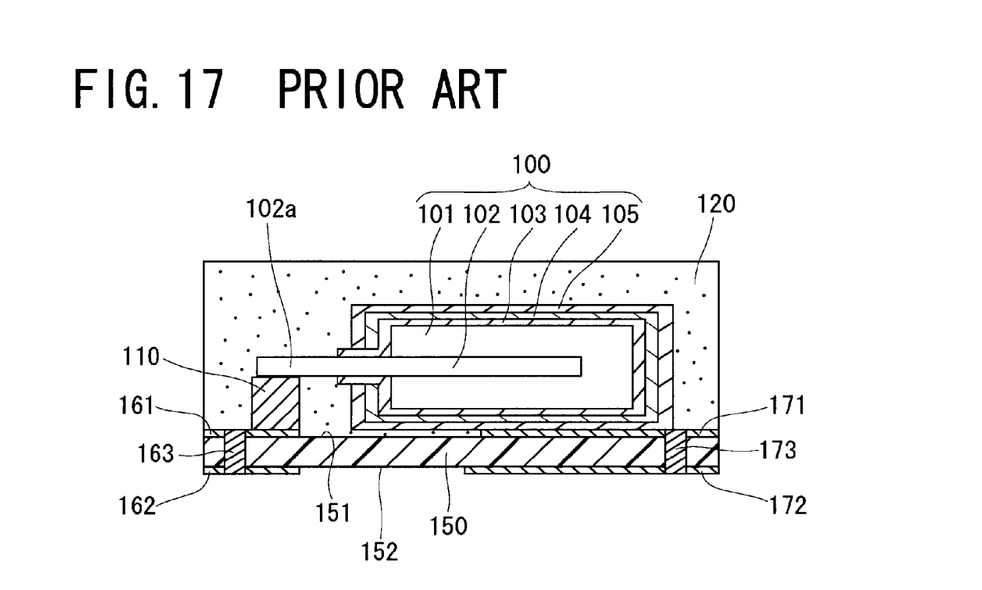
FIG. 17 is a cross sectional view showing another conventional solid electrolytic capacitor.

Therefore, as shown in FIG. 17, there has been proposed to mount the capacitor element 100 on an insulating substrate 150. The insulating substrate 150 includes a first surface 151, on which a first anode layer 161 and a first cathode layer 171 are formed, and the capacitor element 100 is mounted on the first cathode layer 171. Also, the insulating substrate 150 includes a second surface 152 on the opposite side to the first surface 151. On the second surface 152, formed are a second anode layer 162 at a position opposed to the first anode layer 161 through the insulating substrate 150 and a second cathode layer 172 at a position opposed to the first cathode layer 171 through the insulating substrate 150. The second anode layer 162 and the second cathode layer 172 form lower surface electrodes.

The insulating substrate 150 is further provided with an anode via 163 and a cathode via 173 which penetrate the insulating substrate 150 from the first surface 151 to the second surface 152. The anode via 163 connects the first anode layer 161 and the second anode layer 162 to each other electrically, and the cathode via 173 connects the first cathode layer 171 and the second cathode layer 172 to each other electrically.

As shown in FIG. 17, a pad member 110 is placed on a surface of the first anode layer 161, and which is made of metal and has conductive property. A tip end part 102a of the anode lead 102 is connected to a tip end part of the pad member 110. In contrast, the cathode layer 105 of the capacitor element 100 is connected to the first cathode layer 171.

By forming the solid electrolytic capacitor using the insulating substrate 150, distances from the lower surface of the capacitor element 100 to the lower surface electrodes decrease. Therefore, lengths of electrically-conducting paths from the capacitor element 100 to the lower surface electrodes decrease, and the ESR or ESL of the solid electrolytic capacitor decreases.

Also, in the solid electrolytic capacitor shown in FIG. 17, is not necessary to perform the bending process which is required in the manufacturing process of the solid electrolytic capacitor shown in FIG. 16.

However, in the solid electrolytic capacitor shown in FIG. 17, in a case where the tip end part 102a of the anode lead 102 and the tip end part of the metal pad member 110 are connected by welding, a part of the pad member 110 melts, resulting in change in a height dimension of the pad member 110, or positional shift of the pad member 110 due to pressing force applied to the pad member 110 at the time of welding, to possibly deteriorating assembling precision.

SUMMARY OF THE INVENTION

In view of above described problems, an object of the present invention is to provide a solid electrolytic capacitor with high assembling precision.

A first solid electrolytic capacitor according to the present invention comprises a solid electrolyte type capacitor element including a dielectric layer intervening between an anode section and a cathode section, and an insulating substrate on which the capacitor element is mounted. The insulating substrate includes a first surface on which the capacitor element is mounted and a second surface on the opposite side to the first surface. The first surface is provided thereon with a first anode layer to which the anode section of the capacitor element is electrically connected and a first cathode layer to which the cathode section of the capacitor element is electrically connected. The second surface is provided thereon with a second anode layer electrically connected to the first anode layer and a second cathode layer electrically connected to the first cathode layer. Here, a pad member with electrical insulation property projects on the first surface of the insulating substrate, and the first anode layer is formed on a tip end surface of the pad member.

In the first solid electrolytic capacitor described above, even in a case where the anode section of the capacitor element is arranged at a position spaced apart from the first surface of the insulating substrate, the first anode layer formed on the tip end surface of the pad member can come into contact with the anode section of the capacitor element by adjusting the height dimension of the pad member. Therefore, it is easy to connect electrically the anode section of the capacitor element and the first anode layer to each other, thereby obtaining a good electric connection between the anode section of the capacitor element and the first anode layer.

Also, in the first solid electrolytic capacitor described above, for the pad member, employed is a material having electrical insulation property. Therefore, even in a case where the anode section of the capacitor element is connected to the first anode layer by welding, the pad member does not melt easily. Accordingly, the height dimension of the pad member is not likely to change, and the pad member is not likely to have positional shift due to pressing force applied to the pad member at the time of welding. Thus, the first solid electrolytic capacitor described above has a high assembling precision.

A second solid electrolytic capacitor according to the present invention is the first solid electrolytic capacitor described above, wherein the pad member is formed from a second insulating substrate which is different from the insulating substrate.

A third solid electrolytic capacitor according to the present invention is the first or the second solid electrolytic capacitor described above, wherein a fitting groove is formed in a tip end part of the pad member, the anode section of the capacitor element fits the fitting groove, and a part of the first anode layer is formed on an inner surface of the fitting groove.

According to the third solid electrolytic capacitor described above, the anode section of the capacitor element is fastened by the fitting groove, thereby reducing positional shift of the capacitor element with respect to the insulating substrate. Therefore, the size of the insulating substrate can be smaller by the amount of reduction of the positional shift, resulting in improvement of a space factor of the capacitor element. Also, since a part of the first anode layer is formed on the inner surface of the fitting groove, a good electric connection between the first anode layer and the anode section of the capacitor element is obtained.

A fourth solid electrolytic capacitor according to the present invention is the third solid electrolytic capacitors described above, wherein a plurality of capacitor elements are mounted on the first surface of the insulating substrate, the fitting grooves are formed at a plurality of positions in the tip end part of the pad member corresponding to the plurality of capacitor elements, and a slit is formed at a position between adjacent fitting grooves of the pad member.

According to the fourth solid electrolytic capacitor described above, although stress is applied to the pad member when the anode section of the capacitor element fits each fitting groove, the stress is relaxed by the slit formed in the pad member. Therefore, damage of the pad member is prevented.

A fifth solid electrolytic capacitor according to the present invention is any one of the first to fourth solid electrolytic capacitors described above, wherein the insulating substrate and the pad member are provided with a conductive via extending from the tip end surface of the pad member to the second surface of the insulating substrate, and the conductive via connects the first anode layer and the second anode layer to each other electrically.

A sixth solid electrolytic capacitor according to the present invention is any one of the first to fifth solid electrolytic capacitors described above, wherein the first anode layer and the first cathode layer are arranged spaced apart from each other in a first direction, while the second anode layer and the second cathode layer are arranged spaced apart from each other in a second direction that is generally perpendicular to the first direction, and the capacitor element is mounted on the first surface of the insulating substrate with the anode section of the capacitor element facing the first direction.

In the sixth solid electrolytic capacitor described above, specifically, in a case where the first direction is set to the short direction of the insulating substrate, the pad member and the first anode layer can extend longer in a direction that is generally perpendicular to the direction where the anode section of the capacitor element faces, in comparison with a solid electrolytic capacitor in which the first anode layer and the first cathode layer are arranged spaced apart from each other in the longitudinal direction of the insulating substrate.

Therefore, by arranging the plurality of capacitor elements in the second direction with the anode section of each capacitor element facing the first direction, many capacitor elements can be mounted on the solid electrolytic capacitor according to the present invention without changing the size of the contour. As a result, in the solid electrolytic capacitor according to the present invention, the total connection area between the anode section of the capacitor element and the first anode layer increases, and the ESR or ESL of the solid electrolytic capacitor decreases.

DETAILED DESCRIPTION OF THE PREFERRED EMBODIMENT

A preferred embodiment of the present invention is described in detail below with reference to the drawings.

Figure 1:
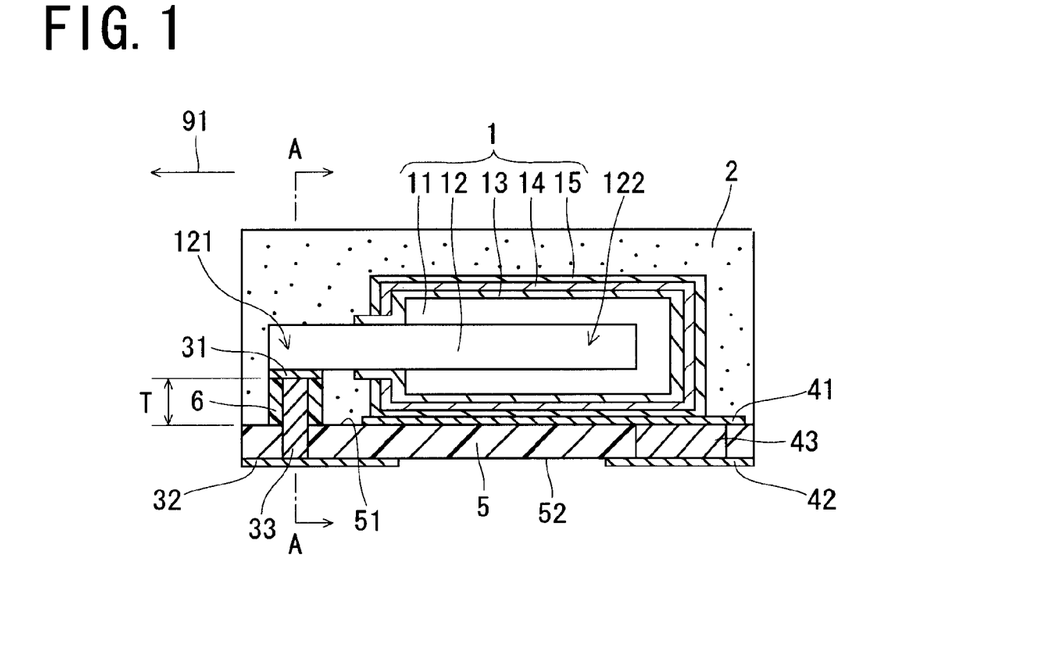
FIG. 1 is a cross sectional view showing a solid electrolytic capacitor in accordance with an embodiment of the present invention.

FIG. 1 is a cross sectional view showing a solid electrolytic capacitor in accordance with an embodiment of the present invention. As shown in FIG. 1, the solid electrolytic capacitor of this embodiment includes an insulating substrate 5, and a capacitor element 1 which is lead type and electrolyte type. The capacitor element 1 is mounted on the insulating substrate 5, and is buried in an enclosure resin 2.

The insulating substrate 5 includes a first surface 51, on which a first cathode layer 41 is formed, and the capacitor element 1 is mounted on the first cathode layer 41.

Also, on the first surface 51 of the insulating substrate 5, a pad member 6 projects at a position spaced apart from the first cathode layer 41 in a predetermined direction (a first direction 91). The pad member 6 has electrical insulation property, and includes a tip end surface on which a first anode layer 31 is formed. Here, the pad member 6 is formed from a second insulating substrate which is different from the insulating substrate 5.

The insulating substrate 5 also includes a second surface 52 which is on the opposite side to the first surface 51. On the second surface 52, a second cathode layer 42 is formed, and a second anode layer 32 is formed at a position spaced apart from the second cathode layer 42 in the first direction 91. Here, a part of the second cathode layer 42 is opposed to the first cathode layer 41 through the insulating substrate 5, and a part of the second anode layer 32 is opposed to the first anode layer 31 through the insulating substrate 5.

As shown in FIG. 1, the pad member 6 and the insulating substrate 5 are provided with an anode via 33 extending from the tip end surface of the pad member 6 to the second surface 52 of the insulating substrate 5, and the anode via 33 connects the first anode layer 31 and the second anode layer 32 to each other electrically.

In the insulating substrate 5, further formed is a cathode via 43 extending from the first surface 51 to the second surface 52 of the insulating substrate 5, and the cathode via 43 connects the first cathode layer 41 and the second cathode layer 42 to each other electrically.

The first surface 51 of the insulating substrate 5 is covered by the enclosure resin 2, while the second surface 52 of the insulating substrate 5 is not covered by the enclosure resin 2 and is exposed therefrom. Therefore, the second anode layer 32 and the second cathode layer 42 are exposed on an outer peripheral surface of the solid electrolytic capacitor, and the second anode layer 32 and the second cathode layer 42 form lower part electrodes of the solid electrolytic capacitor.

A lateral end surface of the insulating substrate 5 may be covered by the enclosure resin 2, or may be exposed from the enclosure resin 2.

As shown in FIG. 1, the capacitor element 1 has an anode body 11 in which an anode lead 12 is planted. Here, the anode body 11 is formed by a porous sintered body made of a valve metal, for which employed is a metal such as tantalum, niobium, titanium, or aluminum.

The anode lead 12 includes a base end part 122 buried in the anode body 11, and a tip end part 121 extracted from a surface of the anode body 11. The anode lead 12 is made of a valve metal which is the same kind as or different kind from the valve metal which forms the anode body 11, and the anode body 11 and the anode lead 12 are electrically connected to each other.

A dielectric layer 13 is formed on surfaces of the anode body 11 and a base of an extracted part of the anode lead 12. The dielectric layer 13 includes an oxide film formed on the surface of the anode body 11, and an oxide film formed on the surface of the base of the extracted part of the anode lead 12. These oxide films are formed by immersing the anode body 11 and the anode lead 12 in an electrolytic solution such as phosphate aqueous solution or adipic acid aqueous solution to oxidize exposed surfaces of the anode body 11 and the anode lead 12 electrochemically (anodic oxidation).

An electrolyte layer 14 is formed on an outer peripheral surface of the dielectric layer 13, using an electrically-conductive inorganic material such as manganese dioxide, or an electrically-conductive organic material such as TCNQ (Tetracyano-quinodimethane) complex salt or electrically-conductive polymer.

A cathode layer 15 is formed on an outer peripheral surface of the electrolyte layer 14. The cathode layer 15 includes a carbon layer (not shown) formed on the electrolyte layer 14 and a silver paste layer (not shown) formed on the carbon layer, and the electrolyte layer 14 and the cathode layer 15 are electrically connected to each other.

In the capacitor element 1 described above, the anode body 11 and the anode lead 12 form an anode section of the capacitor element 1, while the electrolyte layer 14 and the cathode layer 15 form a cathode section of the capacitor element 1.

The capacitor element 1 described above is mounted on the first cathode layer 41 formed on the first surface 51 of the insulating substrate 5, with the tip end part 121 of the anode lead 12 facing the first direction 91. The tip end part 121 of the anode lead 12 is bonded to the first anode layer 31 by welding, while the cathode layer 15 of the capacitor element 1 is connected to the first cathode layer 41 on the insulating substrate 5 by a conductive adhesive.

Thus, the anode section of the capacitor element 1 is electrically connected to the second anode layer 32 through the first anode layer 31 and the anode via 33, while the cathode section of the capacitor element 1 is electrically connected to the second cathode layer 42 through the first cathode layer 41 and the cathode via 43.

Figure 2:
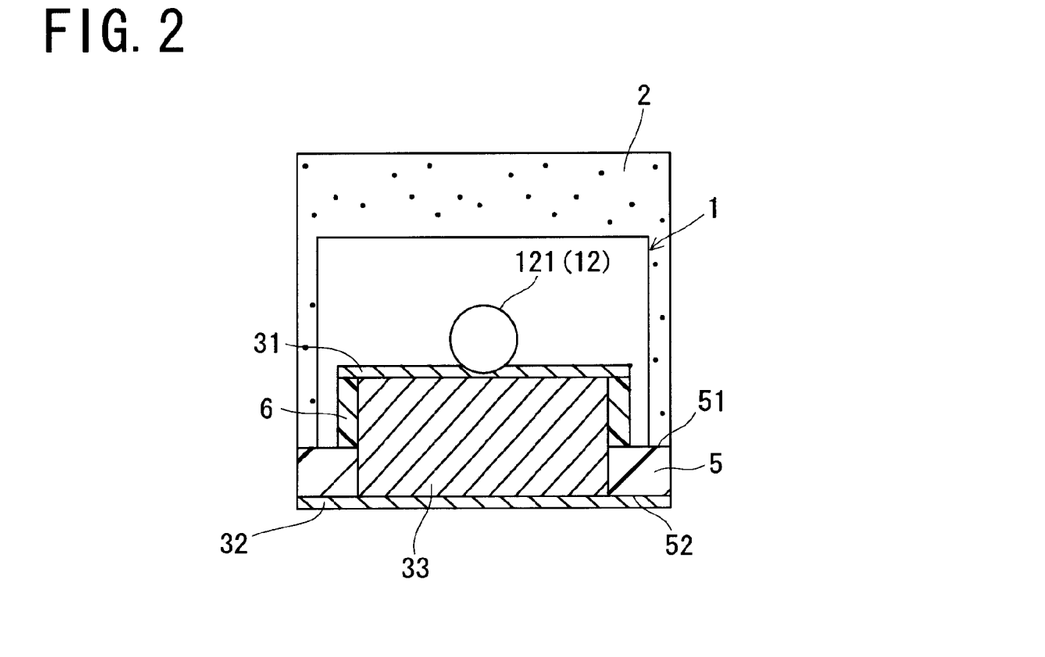
FIG. 2 is a cross sectional view taken along the line A-A shown in FIG. 1.

Also, due to the welding of the tip end part 121 of the anode lead 12 and the first anode layer 31, a part of the tip end part 121 of the anode lead 12 intrudes in the first anode layer 31 as shown in FIG. 2, thereby increasing connection area between the tip end part 121 of the anode lead 12 and the first anode layer 31. Therefore, resistance is not likely to occur between the anode lead 12 and the first anode layer 31.

A manufacturing method of the above described solid electrolytic capacitor is explained below.

Figure 3:
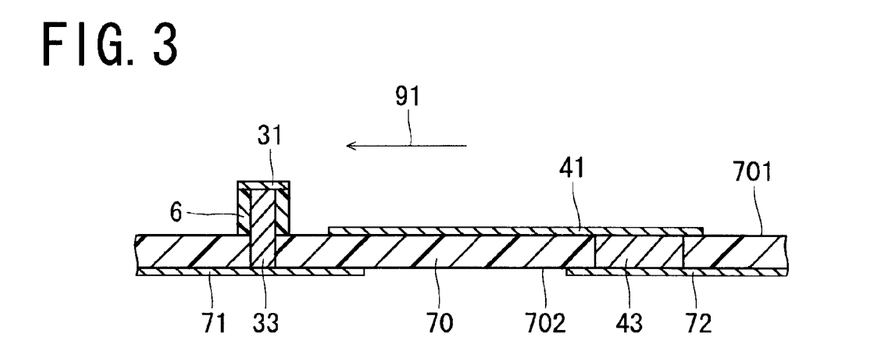
FIG. 3 is a cross sectional view showing a substrate frame produced in a substrate frame manufacturing step in a manufacturing method of the solid electrolytic capacitor.

FIG. 3 is a cross sectional view showing a substrate frame produced in a substrate frame manufacturing step in the manufacturing method of the solid electrolytic capacitor. As shown in FIG. 3, the substrate frame manufactured in this step includes an insulating substrate material 70 which is to be the insulating substrate 5. The insulating substrate material 70 includes a first surface 701, on which the first cathode layer 41 is formed and the pad member 6 projects at a position spaced apart from the first cathode layer 41 in the predetermined direction (the first direction 91). The pad member 6 includes the tip end surface on which the first anode layer 31 is formed.

The insulating substrate material 70 also includes a second surface 702 which is on the opposite side to the first surface 701. And on the second surface 702, a second cathode forming layer 72 is formed, and a second anode forming layer is formed at a position spaced apart from the second cathode forming layer 72 in the first direction 91. Here, a part of the second cathode forming layer 72 is opposed to the first cathode layer 41 through the insulating substrate material 70, and a part of the second anode forming layer 71 is opposed to the first anode layer 31 through the insulating substrate material 70.

As shown in FIG. 3, the pad member 6 and the insulating substrate material 70 are provided with an anode via 33 extending from the tip end surface of the pad member 6 to the second surface 702 of the insulating substrate material 70, and the anode via 33 connects the first anode layer 31 and the second anode forming layer 71 to each other electrically.

The insulating substrate material 70 is further provided with a cathode via 43 extending from the first surface 701 to the second surface 702 of the insulating substrate material 70, and the cathode via 43 connects the first cathode layer 41 and the second cathode forming layer 72 to each other electrically.

Figure 4:
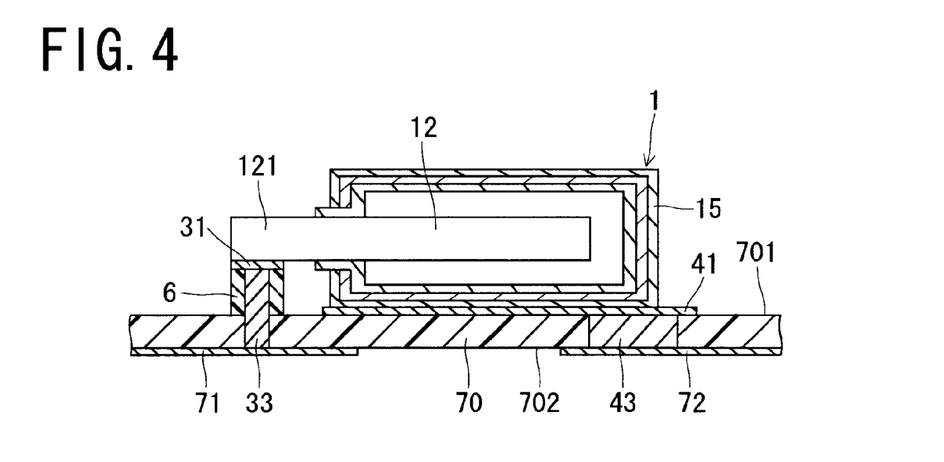
FIG. 4 is a cross sectional view for explaining a mounting step of the manufacturing method.

FIG. 4 is a cross sectional view for explaining a mounting step of the manufacturing method of the solid electrolytic capacitor. The mounting step is performed after performing the substrate frame manufacturing step. As shown in FIG. 4, in the mounting step, the capacitor element 1 described above is mounted on the first cathode layer 41 formed on the first surface 701 of the insulating substrate material 70, with the tip end part 121 of the anode lead 12 facing the first direction 91.

Then, exposed surface of the tip end part 121 of the anode lead 12 comes into contact with the first anode layer 31, and welding is performed on the contact surface to bond the tip end part 121 of the anode lead 12 to the first anode layer 31, thereby connecting the anode lead 12 and the first anode layer 31 to each other electrically.

Also, a part of the outer peripheral surface of the cathode layer 15 of the capacitor element 1 is adhered to the surface of the first cathode layer 41 using a conductive adhesive, thereby connecting the cathode layer 15 of the capacitor element 1 and the first cathode layer 41 to each other electrically.

Figure 5:
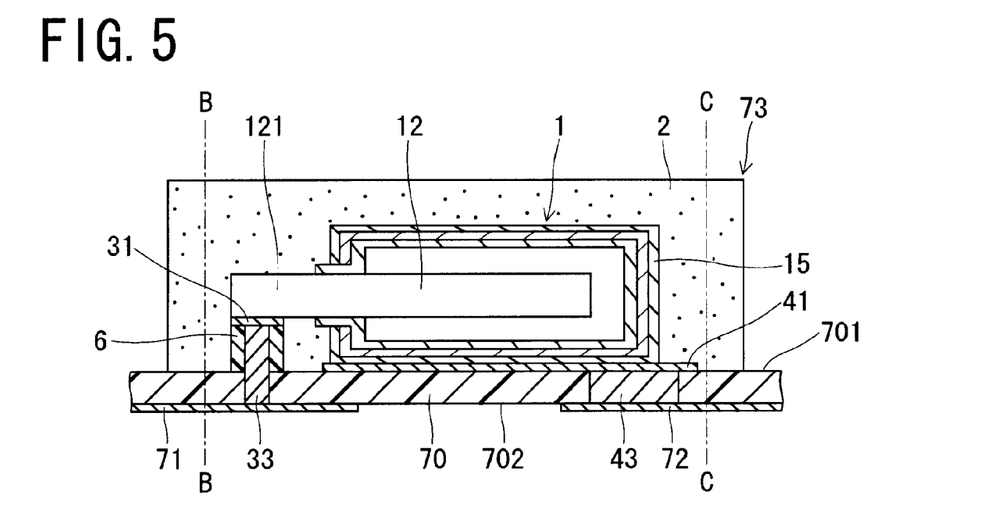
FIG. 5 is a cross sectional view for explaining an enclosure resin forming step and a cutting step of the manufacturing method.

FIG. 5 is a cross sectional view for explaining an enclosure resin forming step and a cutting step of the manufacturing method of the solid electrolytic capacitor. The enclosure resin forming step is performed after performing the mounting step. As shown in FIG. 5, in the enclosure resin forming step, the enclosure resin 2 is formed on the first surface 701 of the insulating substrate material 70, thereby burying the capacitor element 1, the pad member 6, the first anode layer 31 and the first cathode layer 41 in the enclosure resin 2. In this process, the second surface 702 of the insulating substrate material 70 is not covered by the enclosure resin 2 and is exposed therefrom. Thus, a block body 73 is produced in the enclosure resin forming step.

The cutting step is performed after performing the enclosure resin forming step. As shown in FIG. 5, in the cutting step, the block body 73 produced in the enclosure resin forming step is subjected to a cutting process. Specifically, the block body 73 is cut along the line B-B, thereby cutting the enclosure resin 2, the insulating substrate material 70, and the second anode forming layer 71 along the same plane. Further, the block body 73 is cut along the line C-C, thereby cutting the enclosure resin 2, the insulating substrate material 70, and the second cathode forming layer 72 along the same plane.

By performing the cutting step, both end parts of the insulating substrate material 70 are cut off, thereby forming the insulating substrate 5, and respective parts of the second anode forming layer 71 and the second cathode forming layer 72 are cut off, thereby forming the second anode section 32 and the second cathode section 42. The solid electrolytic capacitor is thereby completed as shown in FIG. 1.

In the solid electrolytic capacitor described above, the tip end part 121 of the anode lead 12 of the capacitor element is arranged at a position spaced apart from the first surface 51 of the insulating substrate 5. However, by adjusting a height dimension T (cf. FIG. 1) of the pad member 6, the first anode layer 31 formed on the tip end surface of the pad member 6 can be in contact with the tip end part 121 of the anode lead 12. Therefore, the anode lead 12 of the capacitor element 1 and the first anode layer 31 are easily connected to each other electrically, thereby obtaining a good electric connection between the anode lead 12 and the first anode layer 31.

Also, in the solid electrolytic capacitor described above, for the pad member 6, employed is a material having electrical insulation property. Specifically, the pad member 6 is formed from a second insulating substrate. Therefore, even in a case where the tip end part 121 of the anode lead 12 is connected to the first anode layer 31 by welding, the pad member 6 does not melt easily. Accordingly, the height dimension T of the pad member 6 is not likely to change, and the pad member 6 is not likely to have positional shift due to pressing force applied to the pad member 6 at the time of welding. Thus, the solid electrolytic capacitor described above has a high assembling precision.

Figure 6:
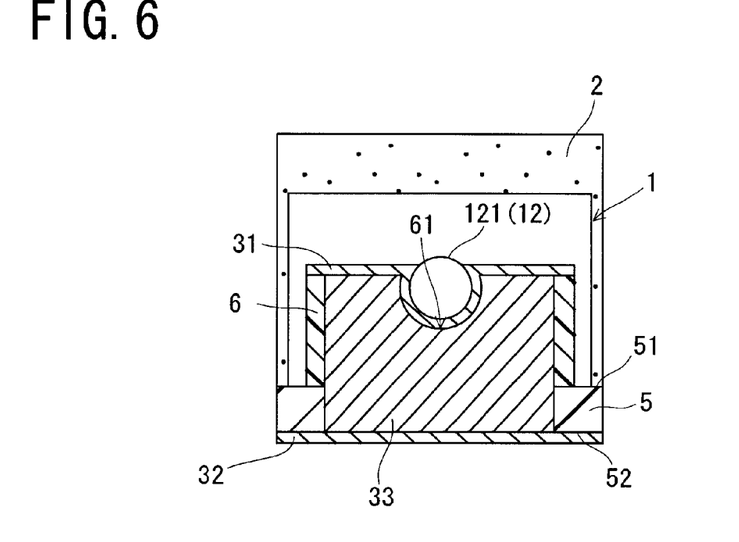
FIG. 6 is a cross sectional view showing a first modification of the solid electrolytic capacitor.

FIG. 6 is a cross sectional view showing a first modification of the solid electrolytic capacitor described above. Also, FIG. 6 is a cross sectional view of the solid electrolytic capacitor of the first modification taken along a line located at the same position as the line A-A shown in FIG. 1.

As shown in FIG. 6, a fitting groove 61 may be formed in a tip end part of the pad member 6. Here, the tip end part 121 of the anode lead 12 fits the fitting groove 61.

According to the solid electrolytic capacitor of the first modification described above, the tip end part 121 of the anode lead 12 is fastened by the fitting groove 61, thereby reducing positional shift of the capacitor element 1 with respect to the insulating substrate 5. Therefore, the size of the insulating substrate 5 can be smaller by the amount of reduction of the positional shift, resulting in improvement of a space factor of the capacitor element 1.

In the solid electrolytic capacitor of the first modification described above, it is preferable that a part of the first anode layer 31 is formed on an inner surface of the fitting groove 61 as shown in FIG. 6, and this structure enables a good electric connection between the first anode layer 31 and the anode lead 12.

Figure 7:
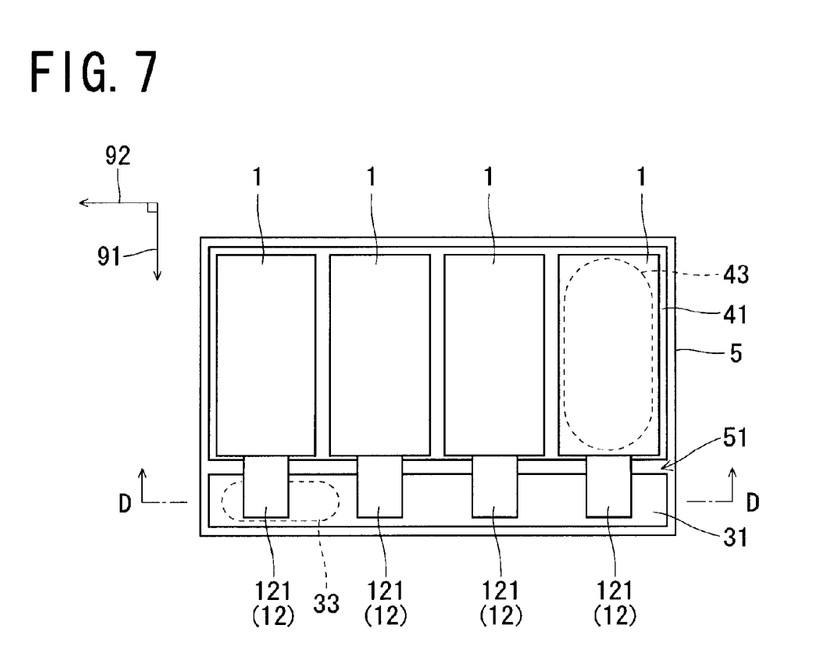
FIG. 7 is a top view showing a second modification of the solid electrolytic capacitor.
Figure 8:
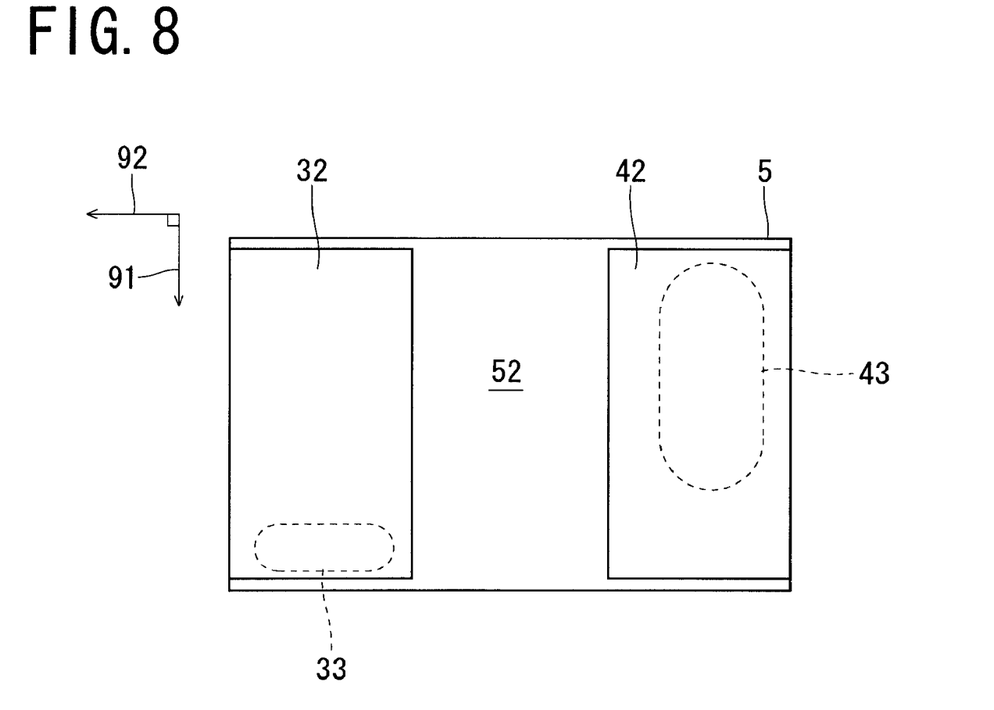
FIG. 8 is a bottom view showing the solid electrolytic capacitor in accordance with the second modification.
Figure 9:
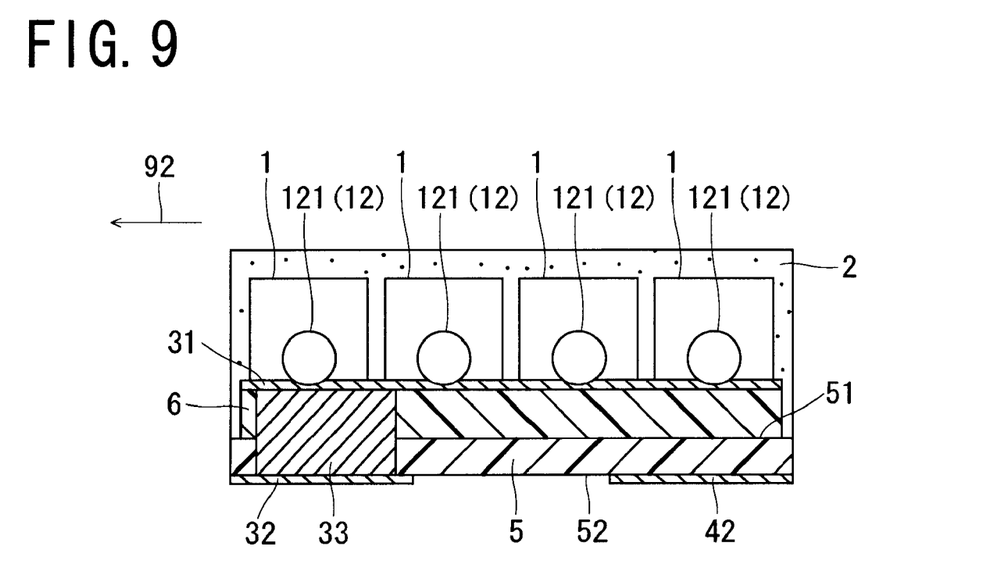
FIG. 9 is a cross sectional view taken along the line D-D shown in FIG. 7.

FIG. 7 and FIG. 8 are a top view and a bottom view showing a second modification of the solid electrolytic capacitor, respectively. In FIG. 7, the enclosure resin 2 is not shown. Also, FIG. 9 is a cross sectional view taken along the line D-D shown in FIG. 7.

As shown in FIG. 7, a plurality of capacitor elements 1 may be mounted on the first cathode layer 41 formed on the first surface 51 of the insulating substrate 5. In such a structure, it is preferable that the first direction 91 is set to the short direction of the insulating substrate 5. Specifically, the first anode layer 31 and the first cathode layer 41 are arranged spaced apart from each other in the short direction as shown in FIG. 7, and the second anode layer and the second cathode layer 42 are arranged space from each other in a second direction 92 (i.e. the longitudinal direction of the insulating substrate 5) that is generally perpendicular to the first direction 91 as shown in FIG. 8. In this preferred structure, the plurality of capacitor elements to be mounted are arranged in the second direction 92 as shown in FIGS. 7 and 9, and the tip end part 121 of the anode lead 12 of each capacitor element 1 faces the first direction 91.

According to the solid electrolytic capacitor of the second modification described above, as shown in FIG. 9, the pad member 6 and the first anode layer 31 can extend longer in the direction that is generally perpendicular to the direction where the tip end part 121 of the anode lead 12 of the capacitor element 1 faces, in comparison with the solid electrolytic capacitor (see FIGS. 1 and 2, for example) in which the first anode layer 31 and the first cathode layer 41 are arranged spaced apart from each other in the longitudinal direction of the insulating substrate 5 (the second direction 92 in FIG. 7).

Therefore, more capacitor elements 1 can be mounted on the solid electrolytic capacitor of this modification than in the solid electrolytic capacitor shown in FIGS. 1 and 2 without changing the size of the contour from the solid electrolytic capacitor shown in FIGS. 1 and 2. As a result, in the solid electrolytic capacitor of this modification, the total connection area between the anode leads 12 of the capacitor elements 1 and the first anode layer 31 increases, and the ESR or ESL of the solid electrolytic capacitor decreases.

In a case where the same number of the capacitor elements as in the solid electrolytic capacitor of the second modification described above are mounted in the solid electrolytic capacitor shown in FIGS. 1 and 2, a thickness dimension of the capacitor element 1 decreases in a direction where the capacitor elements 1 are arranged, reducing the strength of each capacitor element 1. In contrast, in the solid electrolytic capacitor of this modification, since it is not necessary to reduce the thickness dimension of the capacitor element 1, high strength of each capacitor element 1 is maintained.

Figure 10:
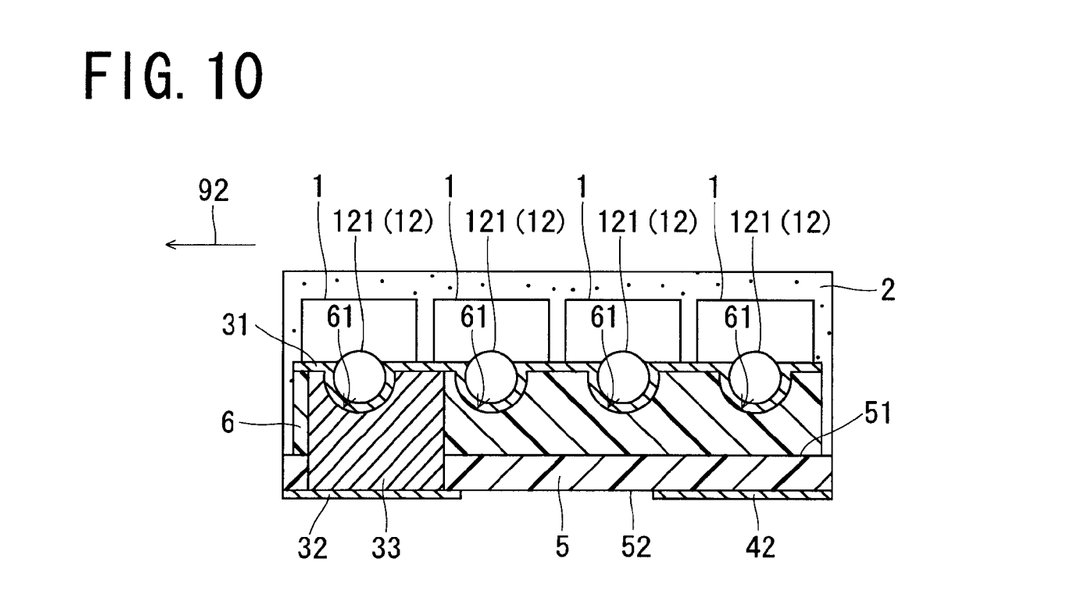
FIG. 10 is a cross sectional view showing a third modification of the solid electrolytic capacitor.

FIG. 10 is a cross sectional view showing a third modification of the solid electrolytic capacitor. Also, FIG. 10 is a cross sectional view of the solid electrolytic capacitor of the third modification taken along a line located at the same position as the line D-D shown in FIG. 7.

As shown in FIG. 10, the fitting grooves 61 may be formed at a plurality of positions in the tip end part of the pad member 6 corresponding to the plurality of capacitor elements in the solid electrolytic capacitor of the second modification described above (cf. FIG. 9). In such a structure, a part of the first anode layer 31 is formed on the inner surface of each fitting groove 61, and thereby the first anode layer 31 is not divided by the fitting groove 61 and forms one continuous layer.

According to the solid electrolytic capacitor of the third modification described above, the tip end part 121 of the anode lead 12 of each capacitor element 1 is fastened by the corresponding fitting groove 61, reducing the positional shift of the capacitor element 1 with respect to the insulating substrate 5. Therefore, a distance between adjacent capacitor elements 1, 1 and the size of the insulating substrate 5 can be smaller by the amount of reduction of the positional shift, resulting in improvement of the space factor of the capacitor element 1.

Also, since a part of the first anode layer 31 is formed on the inner surface of each fitting groove 61, a good electric connection between the first anode layer 31 and the anode lead 12 of each capacitor element 1 is obtained.

Figure 11:
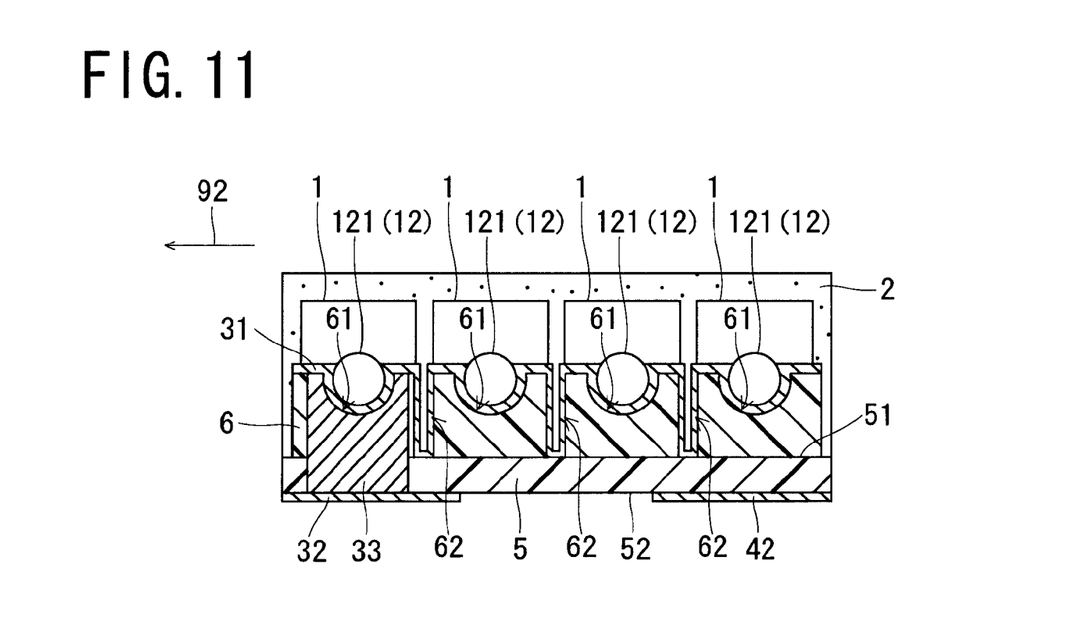
FIG. 11 is a cross sectional view showing a fourth modification of the solid electrolytic capacitor.

FIG. 11 is a cross sectional view showing a fourth modification of the solid electrolytic capacitor. Also, FIG. 11 is a cross sectional view of the solid electrolytic capacitor of the fourth modification taken along a line located at the same position as the line D-D shown in FIG. 7.

As shown in FIG. 11, the pad member 6 may be provided with slits 62. Here, each slit 62 is formed at a position between adjacent fitting grooves 61, 61 of the pad member 6 in the solid electrolytic capacitor of the third modification described above (cf. FIG. 10).

In the solid electrolytic capacitor of the fourth modification described above, although stress is applied to the pad member 6 when the tip end part 121 of the anode lead 12 fits each fitting groove 61, the stress is relaxed by the slits 62 formed in the pad member 6. Therefore, damage of the pad member 6 is prevented.

The present invention is not limited to the foregoing embodiment in construction but can be modified variously within the technical range set forth in the appended claims.

In the solid electrolytic capacitor described above, the pad member 6 is formed from the second insulating substrate which is different from the insulating substrate 5. However, the present invention is not limited to this. The pad member 6 may be formed using various insulating members having electrical insulation property. Also, the pad member 6 may be formed integrally with the insulating substrate 5.

Figure 12:
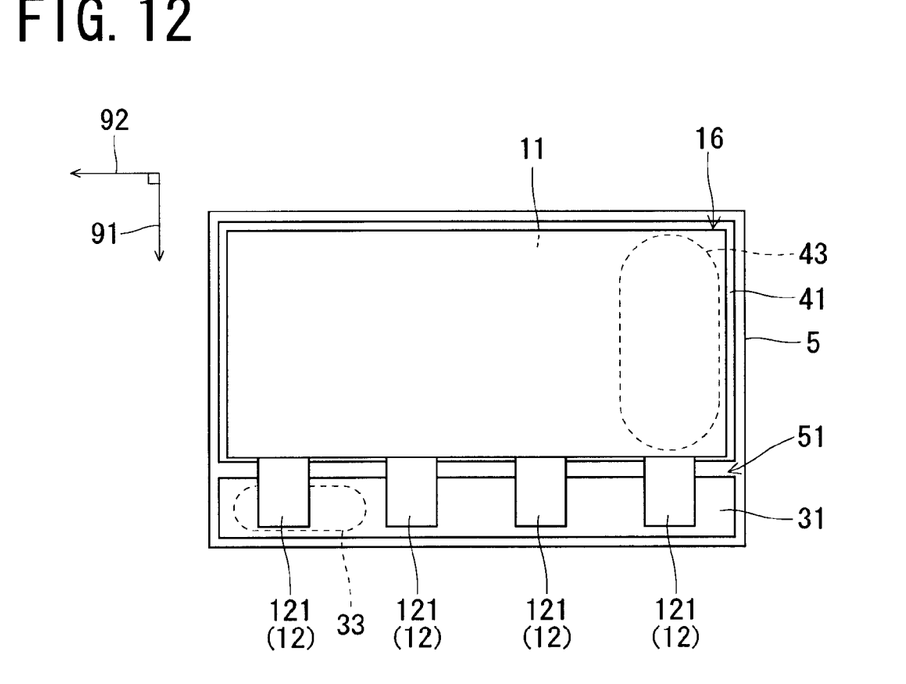
FIG. 12 is a top view showing another modification of the solid electrolytic capacitor.

In the solid electrolytic capacitors in accordance with the second to fourth modifications described above, the plurality of capacitor elements 1 are mounted on the insulating substrate 5. However, the present invention is not limited to this. For example, instead of mounting the plurality of capacitor elements 1 on the insulating substrate 5, a capacitor element 16 including one anode body 11 in which a plurality of anode leads 12 is planted in the same direction may be mounted on the insulating substrate 5 as shown in FIG. 12.

Figure 13:
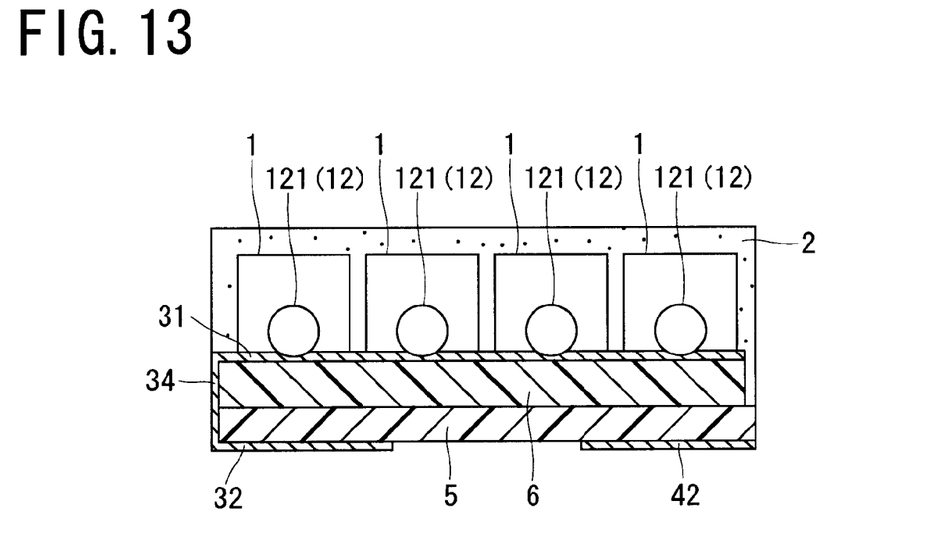
FIG. 13 is a cross sectional view showing a further modification of the solid electrolytic capacitor.

In the solid electrolytic capacitor described above, the first anode layer 31 and the second anode layer 32 are connected to each other electrically by the anode via 33. However, as shown in FIG. 13 for example, the first anode layer 31 and the second anode layer 32 may be connected to each other electrically by a third anode layer 34 formed on lateral end surfaces of the pad member 6 and the insulating substrate 5.

Further, in the manufacturing method described above, the enclosure resin 2 as well as the insulating substrate material is cut in the cutting step to produce the solid electrolytic capacitor. However, the embodiment of the cutting step is not limited to this. For example, the solid electrolytic capacitor may be produced by cutting the insulating substrate material 70 at a position outside an area on the first surface 701 of the insulating substrate material 70 where the enclosure resin 2 is formed, without cutting the enclosure resin 2.

Figure 14:
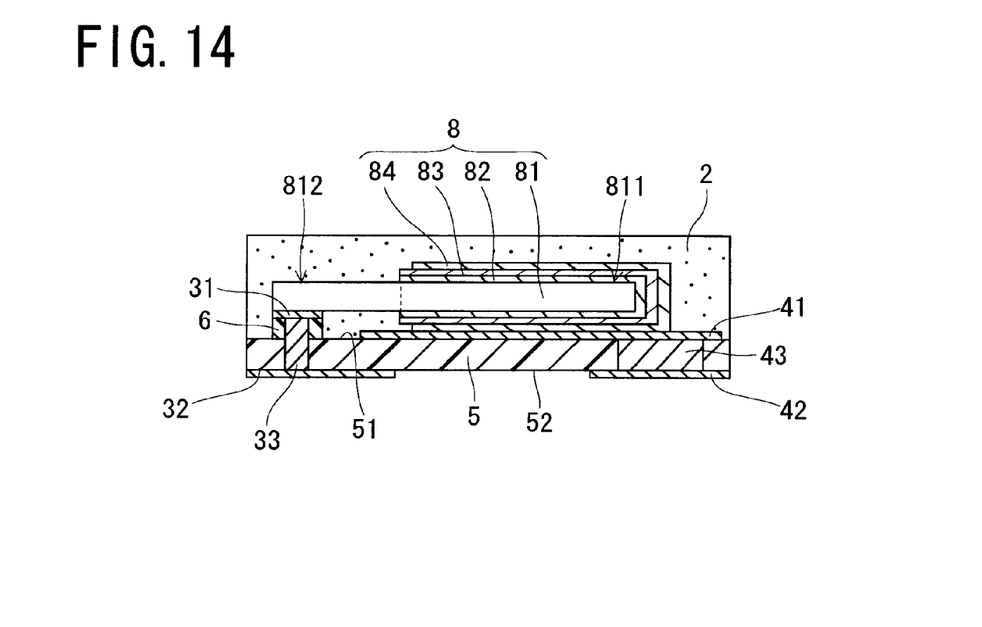
FIG. 14 is a cross sectional view showing an example of the solid electrolytic capacitor including a foil-like capacitor element.

Furthermore, configurations employed in the solid electrolytic capacitor with the lead type capacitor element 1 and the manufacturing method thereof can be applied to the solid electrolytic capacitor including a foil-like capacitor element 8 as shown in FIG. 14.

Here, the foil-like capacitor element 8 includes a foil-like anode body 81, a surface of which includes a first area 811 where a dielectric layer 82 is formed and a second area 812 where the dielectric layer 82 is not formed. An electrolyte layer 83 is formed on the dielectric layer 82, and a cathode layer 84 is formed on the electrolyte layer 83. The second area 812 on the surface of the anode body 81 is connected to the first anode layer 31 formed on the tip end surface of the pad member 6.

Figure 15:
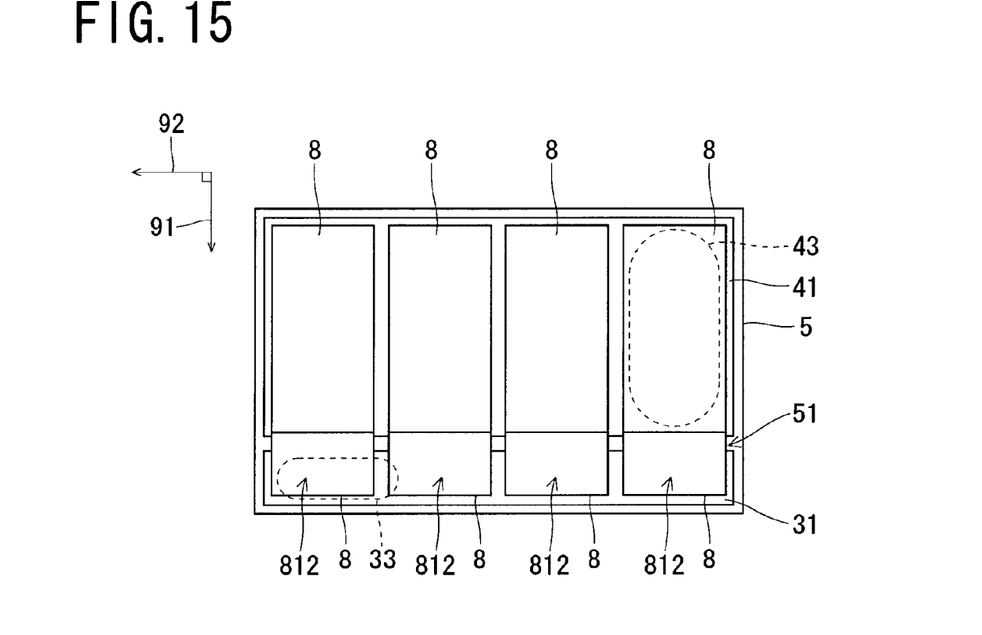
FIG. 15 is a top view showing another example of the solid electrolytic capacitor including a foil-like capacitor element.

Similarly to the solid electrolytic capacitors in accordance with the second to fourth modifications (cf. FIGS. 7 to 11), a plurality of foil-like capacitor elements 8 may be mounted on the insulating substrate 5 as shown in FIG. 15. In such a case, the plurality of foil-like capacitor elements 8 to be mounted are arranged in the second direction 92, and each capacitor element 8 is mounted so that a part of the foil-like anode body 81 where an outer peripheral surface is formed by the second area 812 faces the first direction 91.

What is claimed is:

1. A solid electrolytic capacitor comprising:
   a solid electrolyte type capacitor element including a dielectric layer intervening between an anode section and a cathode section; and
   an insulating substrate on which the capacitor element is mounted, the insulating substrate including a first surface on which the capacitor element is mounted and a second surface on the opposite side to the first surface, the first surface being provided thereon with a first anode layer to which the anode section of the capacitor element is electrically connected and a first cathode layer to which the cathode section of the capacitor element is electrically connected, and the second surface being provided thereon with a second anode layer electrically connected to the first anode layer and a second cathode layer electrically connected to the first cathode layer, wherein a pad member with electrical insulation property projects on the first surface of the insulating substrate, and the first anode layer is formed on a tip end surface of the pad member.

2. The solid electrolytic capacitor according to claim 1, wherein the pad member is formed from a second insulating substrate which is different from said insulating substrate.

3. The solid electrolytic capacitor according to claim 1, wherein a fitting groove is formed in a tip end part of the pad member, the anode section of the capacitor element fits the fitting groove, and a part of the first anode layer is formed on an inner surface of the fitting groove.

4. The solid electrolytic capacitor according to claim 3, wherein a plurality of capacitor elements are mounted on the first surface of the insulating substrate, the fitting grooves are formed at a plurality of positions in the tip end part of the pad member corresponding to the plurality of capacitor elements, and a slit is formed at a position between adjacent fitting grooves of the pad member.

5. The solid electrolytic capacitor according to claim 1, wherein the insulating substrate and the pad member are provided with a conductive via extending from the tip end surface of the pad member to the second surface of the insulating substrate, and the conductive via connects the first anode layer and the second anode layer to each other electrically.

6. The solid electrolytic capacitor according to claim 1, wherein the first anode layer and the first cathode layer are arranged spaced apart from each other in a first direction, while the second anode layer and the second cathode layer are arranged spaced apart from each other in a second direction that is generally perpendicular to the first direction, and the capacitor element is mounted on the first surface of the insulating substrate with the anode section of the capacitor element facing the first direction.

* * * * *